US012738424B2

(12) United States Patent
Ahn et al.

(10) Patent No.: US 12,738,424 B2
(45) Date of Patent: Sep. 15, 2026

(54) MULTILAYER CAPACITOR

(71) Applicant: SAMSUNG ELECTRO-MECHANICS CO., LTD., Suwon-si (KR)

(72) Inventors: Young Ghyu Ahn, Suwon-si (KR); Hwi Dae Kim, Suwon-si (KR); Jin O Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 350 days.

(21) Appl. No.: 18/142,682

(22) Filed: May 3, 2023

(65) Prior Publication Data

US 2024/0055186 A1 Feb. 15, 2024

(30) Foreign Application Priority Data

Aug. 12, 2022 (KR) ........................ 10-2022-0101358

(51) Int. Cl.
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/12* (2013.01)

(58) Field of Classification Search
CPC ......... H01G 4/0085; H01G 4/012; H01G 4/30
See application file for complete search history.

(56) References Cited

U.S. PATENT DOCUMENTS

2010/0027189 A1* 2/2010 Togashi ................. H01G 4/005 361/306.3
2013/0100576 A1* 4/2013 Seo ........................ H01G 4/005 361/301.4
2021/0183569 A1* 6/2021 Lee ........................ H01G 4/248

FOREIGN PATENT DOCUMENTS

JP H08-162360 A 6/1996
JP H09-190946 A 7/1997
JP H10-74659 A 3/1998
JP H11-312622 A 11/1999
JP 2000-311830 A 11/2000
JP 5056653 B2 10/2012
JP 2015-056625 A 3/2015

OTHER PUBLICATIONS

Extended European search Report issued Jan. 23, 2024 for European Patent Application No. 23179190.6.

* cited by examiner

*Primary Examiner* — Nathan Milakovich
(74) *Attorney, Agent, or Firm* — Morgan Lewis & Bockius LLP

(57) ABSTRACT

A multilayer capacitor includes a body including a plurality of dielectric layers disposed in a first direction, a plurality of first internal electrodes disposed in the first direction, and a plurality of second internal electrodes disposed in the first direction. At least a portion of the plurality of first internal electrodes and the plurality of second internal electrodes are spaced apart from each other on a same dielectric layer among the plurality of dielectric layers to have a gap, and among at least three gaps adjacent in the first direction, a gap having a greater distance in the first direction from a reference of the body in the first direction has a greater distance in one direction from a reference of the body in the one direction.

17 Claims, 7 Drawing Sheets

MULTILAYER CAPACITOR

CROSS-REFERENCE TO RELATED APPLICATION(S)

This application claims benefit of priority to Korean Patent Application No. 10-2022-0101358 filed on Aug. 12, 2022 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity. In a capacitor, when two electrodes oppose each other and a voltage is applied thereto, electricity is accumulated in each electrode. When a DC voltage is applied, current flows in the capacitor as electricity is accumulated. However, when the accumulation is completed, the current stops flowing. When an AC voltage is applied, the polarity of the electrodes is changed, such that AC current flows.

Such a capacitor may be divided to several types of capacitor, such as an aluminum electrolytic capacitor, including electrodes formed of aluminum and a thin oxide film provided between the aluminum electrodes, a tantalum capacitor using tantalum as an electrode material, a ceramic capacitor using a high-K dielectric titanium barium between electrodes, a multilayer ceramic capacitor (MLCC) using a high-K ceramic as a dielectric provided between electrodes in a multilayer structure, a film capacitor using a polystyrene film as a dielectric between electrodes, or the like, depending on a type of insulator provided between electrodes.

Among the capacitors described above, multilayer ceramic capacitors may have excellent temperature and frequency properties, and may be implemented to have a small size, and thus have recently been widely applied devices within various fields such as high-frequency circuits. Recently, attempts have been made to implement a small-sized multilayer ceramic capacitor. To this end, a dielectric layer, an internal electrode, and an external electrode are formed to have a small thickness.

Such a multilayer ceramic capacitor may have various capacitances depending on a field or purpose to be used, and a product having relatively low capacitance is also required. A multilayer ceramic capacitor having low capacitance may be generally obtained by using a low-K ceramic as a dielectric material or by reducing the number of stacked internal electrodes.

SUMMARY

An aspect of the present disclosure is to effectively implement a multilayer capacitor having relatively low electric capacitance.

According to an aspect of the present disclosure, there is provided a multilayer capacitor including a body including a plurality of dielectric layers disposed in a first direction, a plurality of first internal electrodes disposed in the first direction, and a plurality of second internal electrodes disposed in the first direction, the body having a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction, and first and second external electrodes covering the third and fourth surfaces of the body and respectively connected to the first and second internal electrodes. At least a portion of the plurality of first internal electrodes and the plurality of second internal electrodes may be spaced apart from each other on a same dielectric layer among the plurality of dielectric layers to have a gap, and among at least three gaps adjacent in the first direction, a gap having a greater distance in the first direction from a reference of the body in the first direction may have a greater distance in one direction from a reference of the body in the one direction.

The one direction may be the second direction.

The gap may have a shape extending in the third direction.

A length of the at least three gaps in the second direction may be maintained.

Adjacent two gaps of the at least three gaps may partially overlap with each other in the first direction.

Among first internal electrodes of the plurality of first internal electrodes which provide the at least three gaps, a first internal electrode closer to the first surface may have a shorter length in the second direction. Among second internal electrodes of the plurality of second internal electrodes which provide the at least three gaps, a second internal electrode closer to the first surface may have a longer length in the second direction.

Among all gaps in the body, a gap having a greater distance in the first direction from the reference of the body in the first direction may have a greater distance in the one direction from the reference of the body in the one direction.

Among at least three other gaps adjacent in the first direction, a gap having a greater distance in the first direction from the reference of the body in the first direction may have a smaller distance in another direction from a reference of the body in the another direction.

The reference of the body in the another direction may be the same as the reference of the body in the one direction, and the another direction may be the same as the one direction.

The one direction may be a direction from the third surface to the fourth surface.

The at least three other gaps and the at least three gaps may be adjacent to each other.

Among the plurality of first internal electrodes and the plurality of the second internal electrodes, one first internal electrode may not have a region overlapping one second internal electrode, adjacent in the first direction, in the first direction.

Among the plurality of first internal electrodes and the second internal electrodes, one second internal electrode may not have a region overlapping one first internal electrode, adjacent in the first direction, in the first direction.

Among the plurality of first internal electrodes and the second internal electrodes, a side surface of one first internal electrode opposing one second internal electrode may be a non-planar surface, and a side surface of the one second internal electrode opposing the one first internal electrode may be a non-planar surface.

The side surface of the one second internal electrode opposing the one first internal electrode may have a shape corresponding to that of the non-planar surface.

The multilayer capacitor may further include at least two of the plurality of first internal electrodes may be arranged on the same dielectric layer among the plurality of dielectric layers, and at least two of the plurality of second internal electrodes may be arranged on the same dielectric layer among the plurality of dielectric layers.

The multilayer capacitor may further include a plurality of third internal electrodes connected to the first external electrode and a plurality of second internal electrodes connected to the first external electrode. A respective one of the plurality of third internal electrodes and a respective one of the plurality of second internal electrodes may be spaced apart from each other on the same dielectric layer, on which a respective one of the plurality of first internal electrodes and a respective one of the plurality of second internal electrodes are disposed, among the plurality of dielectric layers, to have a second gap. Among at least three second gaps adjacent in the first direction, a second gap having a greater distance in the first direction from the reference of the body in the first direction may have a smaller distance in the one direction from the reference of the body in the one direction.

The reference of the body in the first direction may be the first surface of the body, and the reference of the body in the one direction may be the third surface of the body According to example embodiments of the present disclosure, a multilayer capacitor may have relatively low electric capacitance, and may further provide a structure suitable for adjusting electric capacitance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
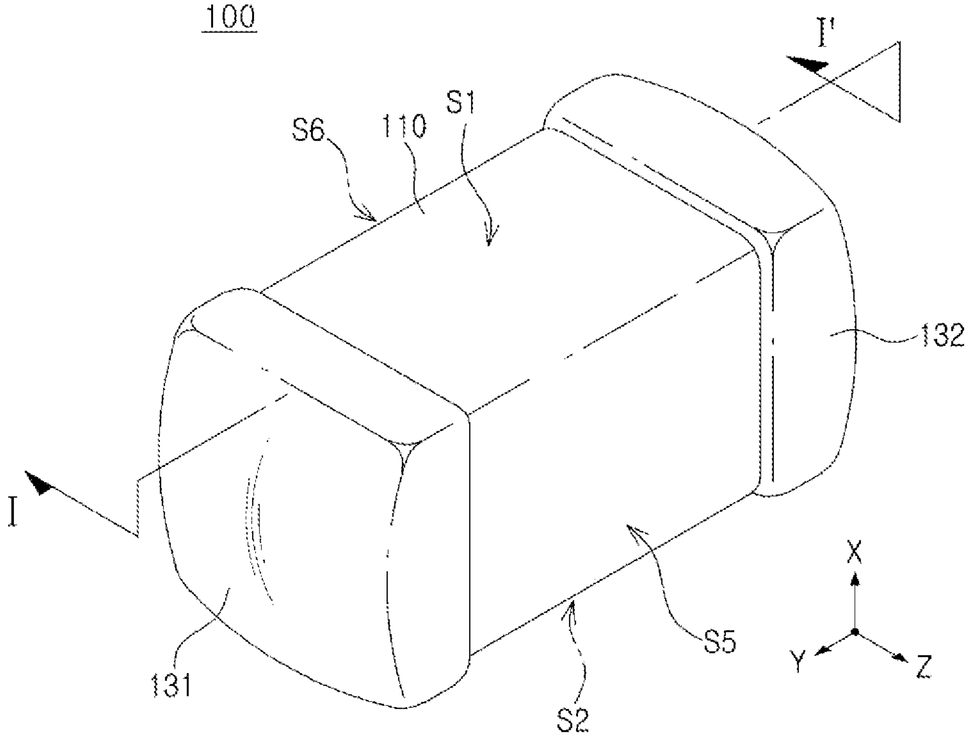
FIG. 1 is a schematic perspective view illustrating an exterior of a multilayer capacitor according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is represented by as "comprising" or "including," it means that it may include other elements as well, rather than excluding other elements, unless specifically stated otherwise.

Figure 2:
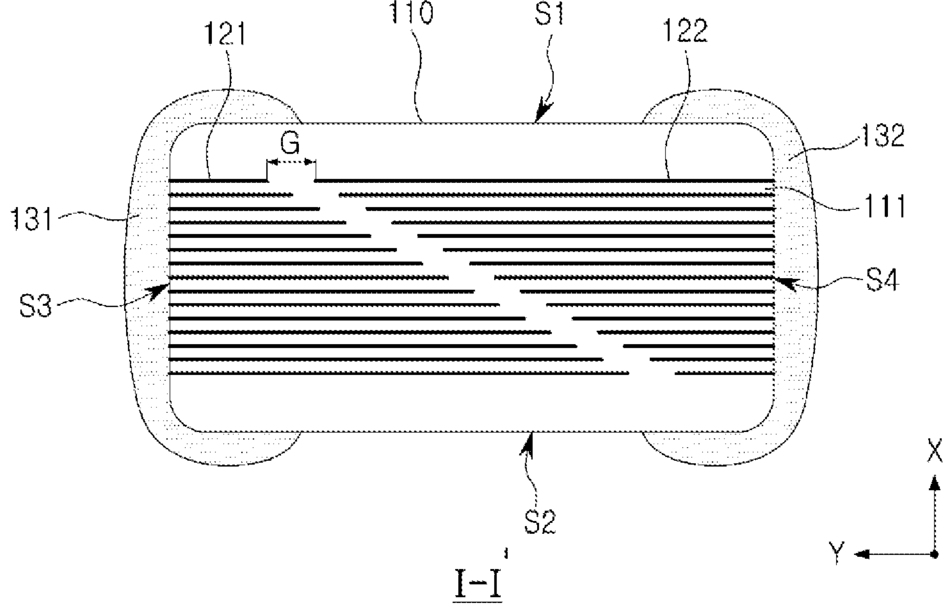
FIG. 2 illustrates an example of a cross-sectional view of the multilayer capacitor of FIG. 1 taken along line I-I'.
Figure 3:
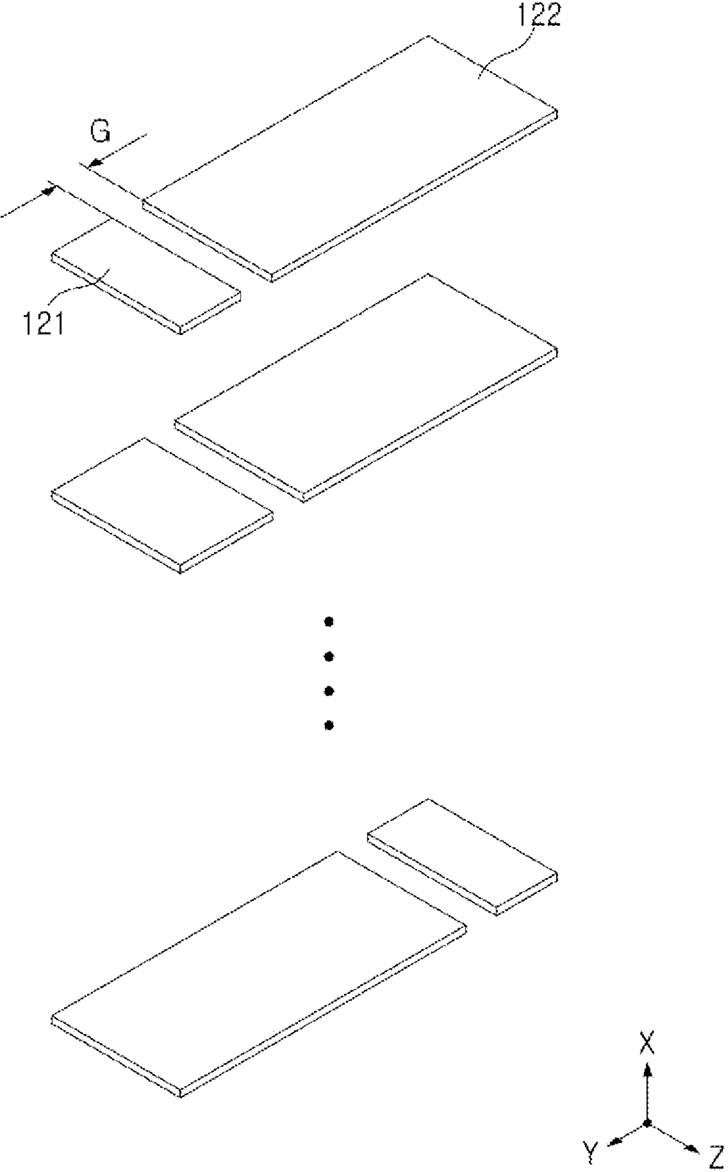
FIG. 3 is a perspective view illustrating internal electrodes in the multilayer capacitor of FIG. 1.

FIG. 1 is a schematic perspective view illustrating an exterior of a multilayer capacitor according to an example embodiment of the present disclosure. FIG. 2 illustrates an example of a cross-sectional view of the multilayer capacitor of FIG. 1 taken along line I-I'. FIG. 3 is a perspective view illustrating an internal electrode in the multilayer capacitor of FIG. 1. FIGS. 4 to 7 illustrate an internal electrode employable in a multilayer capacitor or a multilayer capacitor according to a modification.

First, referring to FIGS. 1 to 3, a multilayer capacitor 100 according to an example embodiment of the present disclosure may include a body 110 including a plurality of dielectric layers 111 and a plurality of internal electrodes 121 and 122, and external electrodes 131 and 132. The first and second internal electrodes 121 and 122 may be spaced apart from each other on the same dielectric layer 111 to have a gap G. In addition, at least three gaps G adjacent to each other in a first direction (X-direction) may be arranged to be moved in one direction while disposed in the first direction (X-direction). For example, among at least three gaps G adjacent in the first direction (X-direction), a gap G having a greater distance in the first direction (X-direction) from a reference of the body (e.g., the first surface S1) in the first direction may have a greater distance in one direction (e.g., Y direction) from a reference of the body (e.g., the third surface S2) in the one direction. Through such a structure, electric capacitance of the multilayer capacitor 100 may mainly be implemented as floating capacitance. Furthermore, the electric capacitance may be effectively adjusted.

The body 110 may have a stack structure in which a plurality of dielectric layers 111 are stacked or disposed in the first direction (X-direction), and may be obtained by, for example, stacking a plurality of green sheets and then sintering the stacked green sheets. By such a sintering process, the plurality of dielectric layers 111 may be integrated with each other, and may include a plurality of grains. As illustrated in FIG. 1, the body 110 may have a shape similar to a rectangular parallelepiped shape. The dielectric layer 111 included in the body 110 may be in a sintered state, and adjacent dielectric layers 111 may be integrated with each other such that boundaries therebetween are not readily apparent without using a scanning electron microscope (SEM). A raw material for forming the dielectric layer 111 is not particularly limited as long as sufficient capacitance is obtainable. For example, a barium titanate-based material, a lead composite perovskite-based material, a strontium titanate-based material, or the like may be used. The barium titanate-based material may include $BaTiO_3$-based ceramic powder. Examples of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$ obtained by partially dissolving Ca or Zr in $BaTiO_3$. In addition, as a material for forming the dielectric layer 111, various ceramic additives, organic solvents, binders, dispersants, and the like may be added to powder such as barium titanate ($BaTiO_3$) depending on the purpose of the present disclosure.

An average thickness of the dielectric layer 111 does not need to be particularly limited. For example, the average thickness of the dielectric layer 111 may be 0.2 μm or more and 10 μm or less. The average thickness of the dielectric layer 111 may refer to an average thickness of the dielectric layer 111 arranged between two adjacent first internal electrodes 121 or between two adjacent second internal electrodes 122. The average thickness of the dielectric layer 111 may be measured by scanning, with an SEM, an image of a cross-section (for example, X-Y cross-section) of the body 110 at a magnification of 10,000λ. More specifically, in the scanned image, a thickness of one dielectric layer 111 may be measured at thirty points equally spaced apart from each other in the second direction (Y-direction), thereby measuring an average value thereof. In addition, when such average value measurement is performed on ten dielectric layers 111, an average thickness of the dielectric layers may be further generalized.

As illustrated in the drawings, the body 110 may have a first surface S1 and a second surface S2 opposing in the first direction (X-direction) in which the first internal electrode 121 and the second internal electrode 122 are disposed, a third surface S3 and a fourth surface S4 connected to the first surface S1 and the second surface S2 and opposing in the second direction (Y-direction), and a fifth surface S5 and a sixth surface S6 connected to the first surface to the four surface S1 to S4 and opposing in a third direction (Z-direction). In this case, the first direction (X-direction), the second direction (Y-direction), and the third direction (Z-direction) may be perpendicular to each other. In the following description, each of the first direction (X-direction), the second direction (Y-direction), and the third direction (Z-direction) may represent opposite directions. For example, the first direction (X-direction) may include both an upward direction and a downward direction with respect to the drawing.

A plurality of first internal electrodes 121 and a plurality of second internal electrodes 122 may be respectively disposed in a first direction (X-direction), and may be respectively connected to the first and second external electrodes 131 and 132. As illustrated in the drawings, at least a portion of the plurality of first internal electrodes 121 and the plurality of second internal electrodes 122 may be spaced apart from each other on the same dielectric layer 111 among the plurality of dielectric layers 111 to have a gap G. In a case according to the related art, internal electrodes having different polarities may be arranged on different dielectric layers to form electric capacitance while opposing each other. Conversely, in the present example embodiment, the first and second internal electrodes 121 and 122 may be formed on the same dielectric layer 111 to minimize a region in which the first and second internal electrodes 121 and 122 oppose each other, such that the first and second internal electrodes 121 and 122 may have relatively low electric capacitance. To this end, at least three gaps G adjacent to each other in the first direction (X-direction) may be arranged to be moved in one direction while disposed in the first direction (X-direction). That is, a position of the gap G may be shifted in a direction depending on a level of the dielectric layer 111, from which, the first and second internal electrodes 121 and 122 may mainly generate floating capacitance rather than electric capacitance due to the first and second internal electrodes 121 and 122 opposing each other. Accordingly, the electric capacitance of the multilayer capacitor 100 may be lowered. In addition, the electric capacitance may be effectively adjusted by adjusting a length or a degree of being shifted of the gap G. In addition, when shapes and arrangements of the internal electrodes 121 and 122 are used as in the present example embodiment, it may not be necessary to excessively reduce the number of stacks of the internal electrodes 121 and 122 so as to lower the electric capacitance. That is, even in the multilayer capacitor 100 requiring low capacitance, the number of stacks of the internal electrodes 121 and 122 may be maintained. When the number of stacks of the internal electrodes 121 and 122 is reduced, an increase in ESR and a decrease in Q value resulting therefrom may be minimized.

The tendency of the gap G to be arranged while being shifted in a direction may need to appear in at least three gaps G adjacent to each other. When the tendency appears only in two or less gaps (G), it may not be considered as being applicable. In this case, as illustrated in the drawings, in the entire region of the body 110, the gap G may be arranged to be moved in one direction while disposed in the first direction (X-direction).

In more detail, the gap G may be arranged to be moved in the second direction (Y-direction) while disposed in the first direction (X-direction). For example, the gap G may be arranged at a position gradually away from the third surface S3 while disposed in a direction (from top to bottom with respect to the drawing) from the first surface S1 to the second surface S2 of the body 110. In addition, the gap G may have a shape extending in the third direction (Z-direction). In this case, the gap G may be arranged to be moved in the second direction (Y-direction) while disposed in the first direction (X-direction) in a state in which a separation distance between the first and second internal electrodes 121 and 122, that is, a length in the second direction (Y-direction), is maintained.

As described above, a degree of being shifted of the gap G may be adjusted in consideration of required electric capacitance. The gap G may be arranged such that a region thereof partially overlaps another gap, adjacent in the first direction (X-direction), in the first direction (X-direction). When there is no region overlapping another adjacent gap G, partial regions of the first and second internal electrodes 121 and 122 may overlap in the first direction (X-direction), such that the electric capacitance may be excessively increased.

In order to obtain an arrangement structure of the gap G as in the present example embodiment, the first internal electrode 121 arranged to be closer to the first surface S1 may have a shorter length in the second direction (Y-direction). Conversely, the second internal electrode 122 arranged to be closer to the first surface S1 may have a longer length in the second direction (Y-direction). In addition, the first internal electrode 121 may not have a region overlapping the second internal electrode 122, adjacent in the first direction (X-direction), in the first direction (X-direction). Similarly, the second internal electrode 122 may not have a region overlapping the first internal electrode 121, adjacent in the first direction (X-direction), in the first direction (X-direction).

The first and second internal electrodes 121 and 122 may be formed by applying a paste including a conductive metal (for example, Ni, Ag, Cu, Ti, Pd, Pt, Sn, or the like) to a surface of a ceramic green sheet to a thickness using a method such as a screen-printing method, a gravure printing method, or the like, and then performing sintering thereon. An average thickness of the first and second internal electrodes 121 and 122 may not need to be particularly limited. For example, the average thickness of the first and second internal electrodes 121 and 122 may be 0.2 μm or more and 3 μm or less. The average thickness of the first and second internal electrodes 121 and 122 may be measured by scanning, with an SEM, an image of a cross-section (for example, X-Y cross-section) of the active portion 101 at a magnification of 10,000×. More specifically, in the scanned image, a thickness of an internal electrode may be measured at thirty points equally spaced from each other in a longitudinal direction, thereby measuring an average value. In addition, when such average value measurement is performed on ten internal electrodes 121 and 122, an average thickness of the internal electrodes 121 and 122 may be further generalized.

The first external electrode 131 may cover the third surface S3 of the body 110, and may be connected to the first internal electrode 121. The second external electrode 132 may the fourth surface S4 of the body 110, and may be connected to the second internal electrode 122. However, in the present example embodiment, a structure in which the multilayer capacitor 100 has two external electrodes 131 and 132 is described. However, the number and shapes of the external electrodes 131 and 132 may be changed depending on the shapes of the internal electrodes 121 and 122 or other purposes. The first and second external electrodes 131 and 132 may be formed of any material having electrical conductivity, such as a metal, may be determined to include a specific material in consideration of electrical properties and structural stability, and may further have a multilayer structure.

For example, the external electrodes 131 and 132 may include an electrode layer and a plating layer covering the electrode layer. The electrode layer may be a sintered electrode including a conductive metal and glass, a resin-based electrode including a conductive metal and a resin, or a multilayer-structure electrode including the sintered electrode and the resin-based electrode. As the conductive metal included in the electrode layer, a material having excellent electrical conductivity may be used, but is not particularly limited. For example, the conductive metal may be one or more of nickel (Ni), copper (Cu), and alloys thereof. The plating layer may serve to improve mounting properties of the multilayer capacitor 100. A type of the plating layer is not particularly limited, and may be a plating layer including one or more of Ni, Sn, Pd, and alloys thereof, and may be formed as a plurality of layers. For example, the plating layer may be a Ni plating layer or a Sn plating layer. The plating layer may have a form in which a Ni plating layer and a Sn plating layer are sequentially formed on the electrode layer or may have a form which a Sn plating layer, a Ni plating layer, and a Sn plating layer are sequentially formed on the electrode layer. In addition, the plating layer may include a plurality of Ni plating layers and/or a plurality of Sn plating layers.

Figure 4:
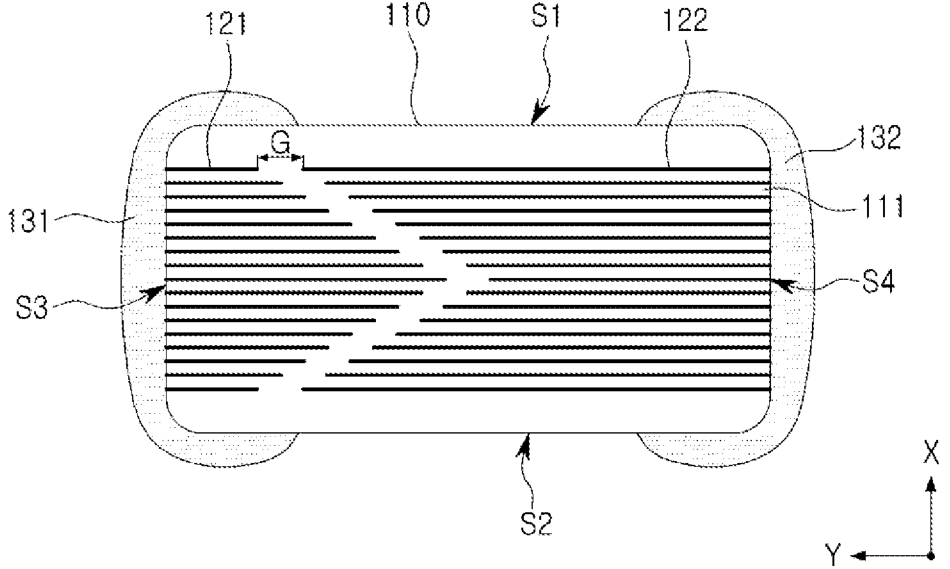
FIGS. 4 to 7 illustrate an internal electrode employable in a multilayer capacitor according to a modification.

A multilayer capacitor according to a modification will be described with reference to FIGS. 4 to 7. First, in the example embodiment of FIG. 4, the gap G may not be shifted in only a direction. That is, as illustrated in FIG. 4, the gap G may be arranged to be move in a direction while disposed in the first direction (X-direction), and to then be moved in the other direction. Specifically, the gap G may be arranged at a position gradually away from the third surface S3 in a direction from the first surface S1 to the second surface S2 (from top to bottom with respect to the drawings), and may be arranged at a position gradually away from the fourth surface S4 as such a path is changed. In this case, the other direction may be a direction opposite to the one direction. For example, the one direction may be a direction from the third surface S3 to the fourth surface S4 of the body 110, and the other direction may be a direction from the fourth surface S4 to the third surface S3.

Figure 5:
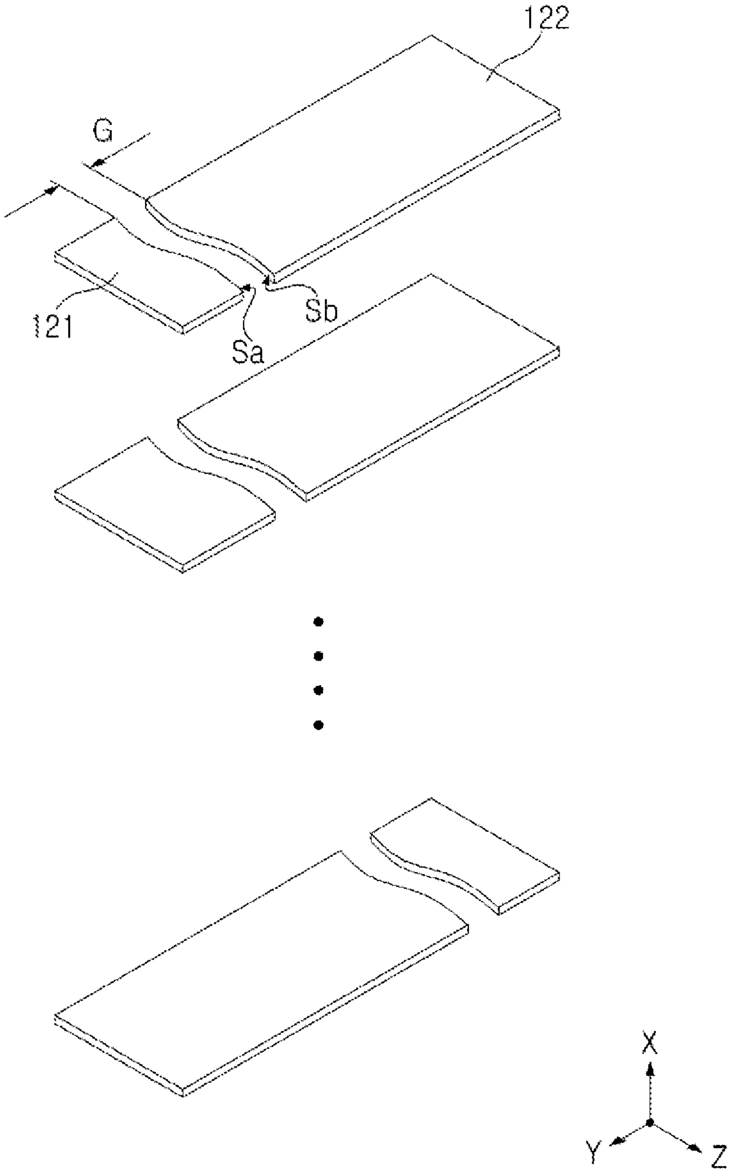

The example embodiment of FIG. 5 may be different from other example embodiments in terms of shapes of the first and second internal electrodes 121 and 122. Specifically, as can be seen from the illustrated structure, a side surface Sa of the first internal electrode 121 opposing the second internal electrode 122 may be a non-planar surface, for example, a curved surface. Similarly, a side surface Sb of the second internal electrode 122 opposing the first internal electrode 121 may be a non-planar surface, for example, a curved surface. In this case, the side surface Sb of the second internal electrode 122 opposing the first internal electrode 121 may have a shape corresponding to that of the non-planar surface. As in the present modification, the side surfaces Sa and Sb opposing each other of the first and second internal electrodes 121 and 122 may be formed as non-planar surfaces, thereby more precisely adjusting electric capacitance of the first and second internal electrodes 121 and 122.

Figure 6:
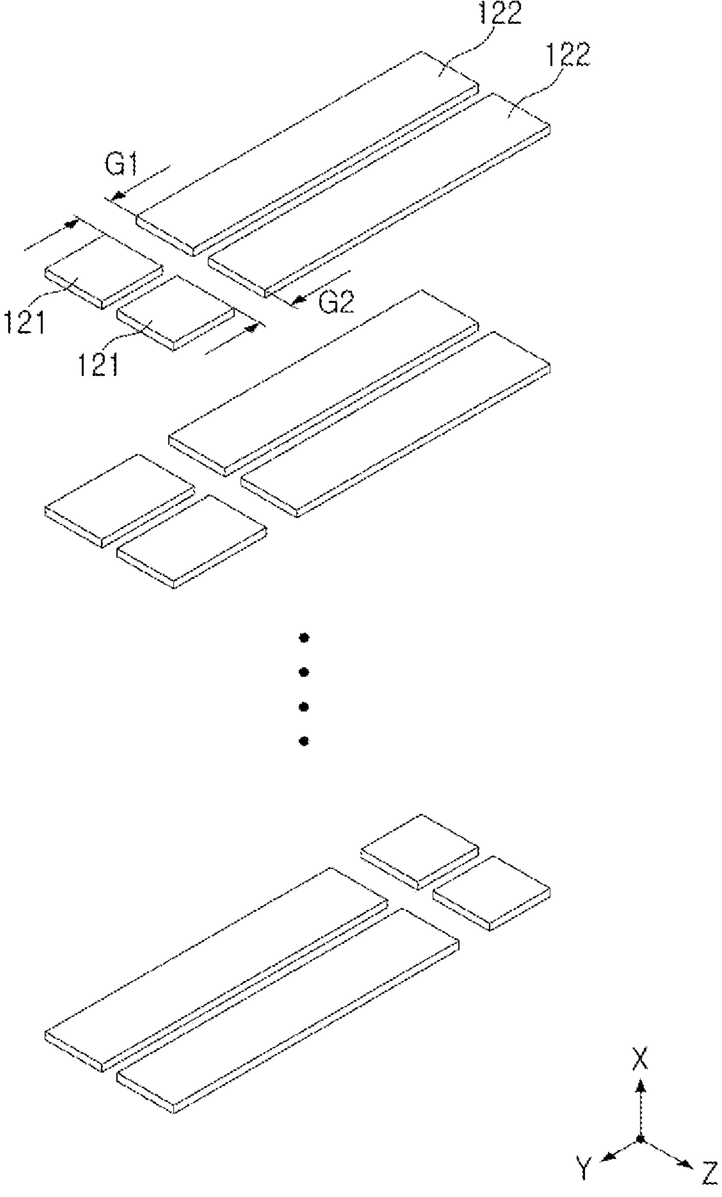
Figure 7:
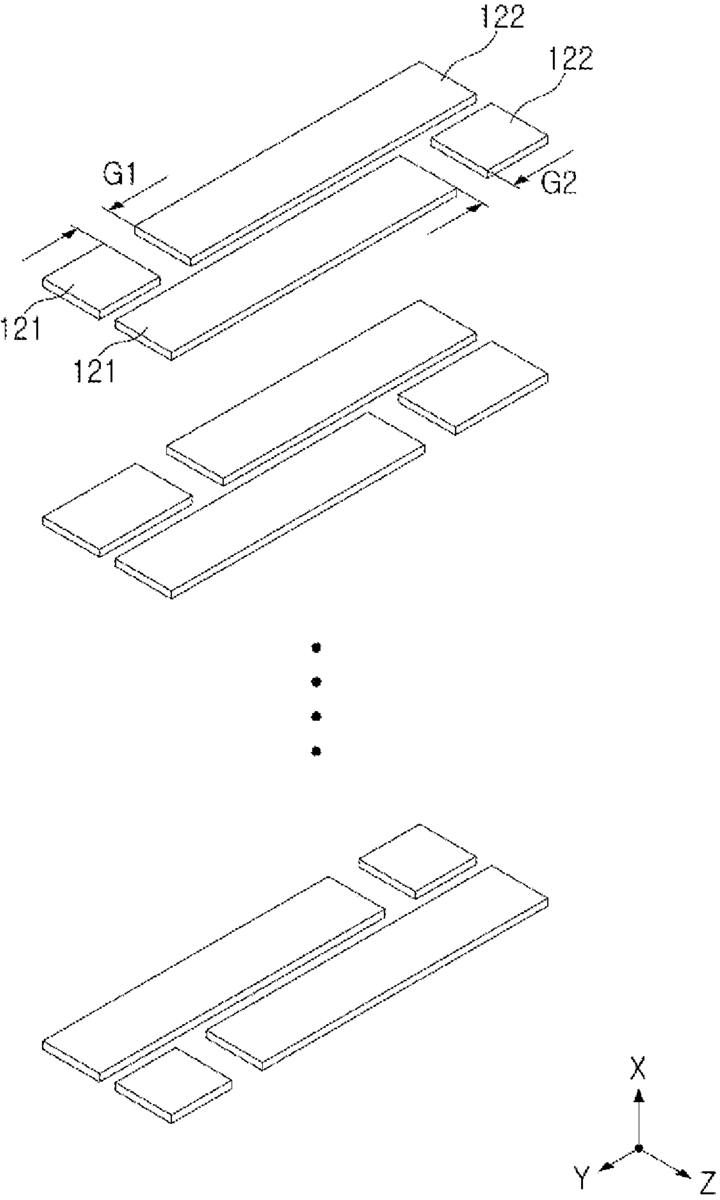

In the example embodiments of FIGS. 6 and 7, internal electrodes having the same polarity may be arranged on the same dielectric layer 111, that is, the first internal electrode 121 and the second internal electrode 122 may be respectively divided into a plurality of first internal electrodes 121 and a plurality of second internal electrodes 122. Such a divided structure may also be advantageous for more precisely adjusting capacitance of the first and second internal electrodes 121 and 122. Specifically, at least two of the plurality of first internal electrodes 121 may be arranged on the same dielectric layer 111 among the plurality of dielectric layers 111, and at least two of the plurality of second internal electrodes 122 may be arranged on the same dielectric layer 111 among the plurality of dielectric layers 111. Accordingly, at least two first internal electrodes 121 and at least two internal electrodes 122 may be arranged on the same dielectric layer 111. FIGS. 6 and 7 illustrate an example in which a total of four internal electrodes 121 and 122 are arranged. In the case of the divided first and second internal electrodes 121 and 122, as in the previous example embodiment, gaps G1 and G2 may be arranged at positions shifted in a direction while disposed in a first direction. In addition, as in the modification of FIG. 7, the gaps G1 and G2 on the same dielectric layer 111 may tend to be shifted in different directions. That is, at least two gaps G1 and G2 may be present on the same dielectric layer 111, and the at least two gaps G1 and G2 arranged on the same dielectric layer 111 may be arranged to be moved in different directions while disposed in the first direction (X-direction). For example, among at least three gaps G1 adjacent in the first direction (X-direction), a gap G1 having a greater distance in the first direction (X-direction) from a reference of the body (e.g., the first surface S1) in the first direction may have a greater distance in one direction (e.g., Y direction) from a reference of the body (e.g., the third surface S2) in the one direction. On the other hand, among at least three gaps G2 adjacent in the first direction (X-direction), a gap G2 having a greater distance in the first direction (X-direction) from the reference of the body (e.g., the first surface S1) in the first direction may have a smaller distance in one direction (e.g., Y direction) from the reference of the body (e.g., the third surface S2) in the one direction.

While example embodiments have been shown and described above, it will be apparent to those skilled in the art that modifications and variations could be made without departing from the scope of the present disclosure as defined by the appended claims.

What is claimed is:

1. A multilayer capacitor comprising:

a body including a plurality of dielectric layers disposed in a first direction, a plurality of first internal electrodes disposed in the first direction, and a plurality of second internal electrodes disposed in the first direction, the body having a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; and first and second external electrodes covering the third and fourth surfaces of the body and respectively connected to the first and second internal electrodes, wherein at least a portion of the plurality of first internal electrodes and the plurality of second internal electrodes are spaced apart from each other on a same dielectric layer among the plurality of dielectric layers to have a gap, among at least three gaps adjacent in the first direction, a gap having a greater distance in the first direction from a reference of the body in the first direction has a greater distance in one direction from a reference of the body in the one direction, and wherein at least two gaps adjacent in the first direction among the at least three gaps at least partially overlap in the first direction.

2. The multilayer capacitor of claim 1, wherein the one direction is the second direction.

3. The multilayer capacitor of claim 1, wherein the gaps have a shape extending in the third direction.

4. The multilayer capacitor of claim 3, wherein a length of the at least three gaps in the second direction is maintained.

5. The multilayer capacitor of claim 1, wherein adjacent two gaps of the at least three gaps partially overlap with each other in the first direction.

6. The multilayer capacitor of claim 1, wherein among first internal electrodes of the plurality of first internal electrodes which provide the at least three gaps, a first internal electrode closer to the first surface has a shorter length in the second direction, and among second internal electrodes of the plurality of second internal electrodes which provide the at least three gaps, a second internal electrode closer to the first surface has a longer length in the second direction.

7. The multilayer capacitor of claim 1, wherein among at least three other gaps adjacent in the first direction, a gap having a greater distance in the first direction from the reference of the body in the first direction has a smaller distance in another direction from a reference of the body in the another direction.

8. The multilayer capacitor of claim 7, wherein the reference of the body in the another direction is the same as the reference of the body in the one direction, and the another direction is the same as the one direction.

9. The multilayer capacitor of claim 8, wherein the one direction is a direction from the third surface to the fourth surface.

10. The multilayer capacitor of claim 7, wherein the at least three other gaps and the at least three gaps are adjacent to each other.

11. The multilayer capacitor of claim 1, wherein among the plurality of first internal electrodes and the plurality of second internal electrodes, one first internal electrode does not have a region overlapping one second internal electrode, adjacent in the first direction, in the first direction.

12. The multilayer capacitor of claim 1, wherein among the plurality of first internal electrodes and the second internal electrodes, a side surface of one first internal electrode opposing one second internal electrode is a non-planar surface, and a side surface of the one second internal electrode opposing the one first internal electrode is a non-planar surface.

13. The multilayer capacitor of claim 12, wherein the side surface of the one second internal electrode opposing the one first internal electrode has a shape corresponding to that of the non-planar surface.

14. The multilayer capacitor of claim 1, further comprising at least two of the plurality of first internal electrodes are arranged on the same dielectric layer among the plurality of dielectric layers, and at least two of the plurality of second internal electrodes are arranged on the same dielectric layer among the plurality of dielectric layers.

15. The multilayer capacitor of claim 1, wherein the reference of the body in the first direction is the first surface of the body, and the reference of the body in the one direction is the third surface of the body.

16. A multilayer capacitor comprising:

a body including a plurality of dielectric layers disposed in a first direction, a plurality of first internal electrodes disposed in the first direction, and a plurality of second internal electrodes disposed in the first direction, the body having a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; and first and second external electrodes covering the third and fourth surfaces of the body and respectively connected to the first and second internal electrodes, wherein at least a portion of the plurality of first internal electrodes and the plurality of second internal electrodes are spaced apart from each other on a same dielectric layer among the plurality of dielectric layers to have a gap, among at least three gaps adjacent in the first direction, a gap having a greater distance in the first direction from a reference of the body in the first direction has a greater distance in one direction from a reference of the body in the one direction, and wherein at least two gaps adjacent in the first direction at least partially overlap in the first direction, wherein, among all gaps in the body, a gap having a greater distance in the first direction from the reference of the body in the first direction has a greater distance in the one direction from the reference of the body in the one direction.

17. A multilayer capacitor comprising:

a body including a plurality of dielectric layers disposed in a first direction, a plurality of first internal electrodes disposed in the first direction, and a plurality of second internal electrodes disposed in the first direction, the body having a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction;

first and second external electrodes covering the third and fourth surfaces of the body and respectively connected to the plurality of the first and second internal electrodes;

at least two of the plurality of first internal electrodes are arranged on the same dielectric layer among the plurality of dielectric layers, and at least two of the plurality of second internal electrodes are arranged on the same dielectric layer among the plurality of dielectric layers; and a plurality of third internal electrodes connected to the first external electrode, wherein the plurality of second internal electrodes are connected to the first external electrode, at least a portion of the plurality of first internal electrodes and the plurality of second internal electrodes are spaced apart from each other on a same dielectric layer among the plurality of dielectric layers to have a gap, among at least three gaps adjacent in the first direction, a gap having a greater distance in the first direction from a reference of the body in the first direction has a greater distance in one direction from a reference of the body in the one direction, a respective one of the plurality of third internal electrodes and a respective one of the plurality of second internal electrodes are spaced apart from each other on the same dielectric layer, on which a respective one of the plurality of first internal electrodes and a respective one of the plurality of second internal electrodes are disposed, among the plurality of dielectric layers, to have a second gap, and among at least three second gaps adjacent in the first direction, a second gap having a greater distance in the first direction from the reference of the body in the first direction has a smaller distance in the one direction from the reference of the body in the one direction.

* * * * *